US012291672B2

(12) United States Patent
Chang et al.

(10) Patent No.: US 12,291,672 B2
(45) Date of Patent: May 6, 2025

(54) BLOWING AGENT INCORPORATED RESIN SYSTEMS FOR CONSOLIDATING SUBTERRANEAN OIL AND GAS BEARING FORMATIONS

(71) Applicant: ARAMCO SERVICES COMPANY, Houston, TX (US)

(72) Inventors: Fakuen Frank Chang, Houston, TX (US); Wenwen Li, Pearland, TX (US); Feng Liang, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/644,119

(22) Filed: Dec. 14, 2021

(65) Prior Publication Data

US 2023/0183556 A1 Jun. 15, 2023

(51) Int. Cl.
*C09K 8/575* (2006.01)
*E21B 43/02* (2006.01)

(52) U.S. Cl.
CPC .......... *C09K 8/5755* (2013.01); *E21B 43/025* (2013.01)

(58) Field of Classification Search
CPC .. C09K 8/5755; C09K 8/5753; C09K 8/5751; C09K 8/575; C09K 8/572; C09K 8/57; E21B 43/025; E21B 43/02; E21B 33/138
See application file for complete search history.

(56) References Cited

U.S. PATENT DOCUMENTS

| | | | | |
|---|---|---|---|---|
| 3,500,928 | A * | 3/1970 | Rockwell | C09K 8/572 |
| | | | | 166/292 |
| 3,976,140 | A | 8/1976 | Shaughnessy et al. | |
| 4,119,150 | A * | 10/1978 | Froelich | E21B 43/025 |
| | | | | 166/69 |
| 4,199,484 | A * | 4/1980 | Murphey | C09K 8/68 |
| | | | | 523/426 |
| 4,842,072 | A * | 6/1989 | Friedman | C09K 8/5755 |
| | | | | 166/295 |
| 4,844,163 | A * | 7/1989 | Hazlett | E21B 33/138 |
| | | | | 166/295 |

(Continued)

FOREIGN PATENT DOCUMENTS

| | | |
|---|---|---|
| CA | 2852199 A1 | 10/2015 |
| CN | 111022011 A | 4/2020 |
| WO | 2007/091058 A1 | 8/2007 |

OTHER PUBLICATIONS

SAFOAM User's Guide, Reedy International Corporation, 2012, retrieved Feb. 25, 2023 from http://www.reedychemicalfoam.com/TDS/IMGuidev2012.pdf (Year: 2012).*

(Continued)

*Primary Examiner* — Angela M DiTrani Leff
(74) *Attorney, Agent, or Firm* — Osha Bergman Watanabe & Burton LLP

(57) ABSTRACT

One or more embodiments relates to a productive consolidated sand pack product. The sand pack product may be a cured resin that is bound to sand particles and has a porous structure. The sand pack product is obtained from curing a resin composition which may include a resin, a curing agent, a chemical blowing agent, a surfactant, a carrier fluid, a pH agent, and a salt. The porous volume may include one or more of trapped gas, bubbles, and open or connected pore space.

12 Claims, 1 Drawing Sheet

200

(56) References Cited

U.S. PATENT DOCUMENTS

| | | | | |
|---|---|---|---|---|
| 5,101,900 A * | 4/1992 | Dees | .................. | E21B 43/25 |
| | | | | 166/299 |
| 5,154,230 A * | 10/1992 | Dees | .................. | C09K 8/54 |
| | | | | 166/299 |
| 5,232,955 A * | 8/1993 | Csabai | .............. | B01D 39/2079 |
| | | | | 507/926 |
| 6,213,209 B1 * | 4/2001 | Nguyen | ................ | C09K 8/518 |
| | | | | 166/278 |
| 6,302,207 B1 * | 10/2001 | Nguyen | ................ | C09K 8/56 |
| | | | | 166/278 |
| 8,186,519 B2 | 5/2012 | Tsujioka et al. | | |
| 9,222,014 B2 * | 12/2015 | Rickman | ................ | C09K 8/80 |
| 9,951,266 B2 * | 4/2018 | Tang | ................ | C09K 8/70 |
| 10,227,524 B2 | 3/2019 | Tellez et al. | | |
| 10,604,694 B1 | 3/2020 | Berger et al. | | |
| 10,858,565 B2 | 12/2020 | Reddy | | |
| 2001/0014702 A1 * | 8/2001 | Harfmann | ............... | C08J 9/141 |
| | | | | 521/146 |
| 2004/0108141 A1 | 6/2004 | Reddy et al. | | |
| 2006/0151168 A1 | 7/2006 | Nguyen et al. | | |
| 2009/0173497 A1 | 7/2009 | Dusterhoft | | |
| 2014/0027116 A1 * | 1/2014 | Suresh | ................ | C09K 8/56 |
| | | | | 166/292 |
| 2015/0122494 A1 | 5/2015 | Vo et al. | | |
| 2016/0280985 A1 | 9/2016 | Sarda-Mantri et al. | | |
| 2017/0015892 A1 | 1/2017 | Nguyen et al. | | |
| 2018/0320055 A1 * | 11/2018 | Chang | ................ | C09K 8/565 |
| 2020/0208046 A1 | 7/2020 | Chang et al. | | |
| 2022/0290035 A1 * | 9/2022 | AlAhmari | ............... | C09K 8/514 |

OTHER PUBLICATIONS

Hexion Specialty Chemicals, Technical Data Bulletin—Epon Resin 828, Sep. 2005 (Year: 2005).*

Richardson, E.A. et al., "Consolidation of Silty Sands With an Epoxy Resin Overflush Process", Journal of Petroleum Technology, vol. 22, No. 09, pp. 1103-1108, 1970 (6 pages).

Brooks, F.A. et al., "Externally Catalyzed Epoxy for Sand Control", Journal of Petroleum Technology, vol. 26, No. 06, pp. 589-594, 1974 (6 pages).

1st Examination Report issued in corresponding Saudi Patent Application No. 122440858, mailed Jan. 29, 2024 (16 pages).

* cited by examiner

BLOWING AGENT INCORPORATED RESIN SYSTEMS FOR CONSOLIDATING SUBTERRANEAN OIL AND GAS BEARING FORMATIONS

BACKGROUND

Productive oil and gas bearing formations may include unconsolidated or weakly-consolidated sand. The unconsolidated or weakly-consolidated sand is prone to mobilization by produced fluid and drilling fluid. Sand that is mobilized and flows into the wellbore is known as produced sand. Sand production may increase when water saturation in the formation increases. Water saturation increase may be due to, for example, subsurface aquifer encroachment or water injection into the formation. In some types of wells, such as water injection wells, the sand may flow back into the injection well despite water injection being temporarily or permanently halted.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, a resin treatment composition may include one or more of a resin, a curing agent, a chemical blowing agent, a surfactant, a carrier fluid, and optionally one or more of a pH adjusting agent, a second surfactant, and a salt. The resin may be a curable resin. A "curable" resin is a material that is able to polymerize and cure.

In another aspect, a method of treating a wellbore may include introducing into a wellbore a pre-flush pill, where the wellbore may include an unconsolidated sand or a weakly-consolidated sand. The method may include introducing into the wellbore a pre-flush pill followed with a resin treatment composition that includes one or more of a resin, a curing agent, a chemical blowing agent, a surfactant, a carrier fluid, and optionally one or more of a pH adjusting agent, a second surfactant, and a salt. The method may further include introducing a post-flush pill into the wellbore, shutting in the well, and maintaining the wellbore to allow a productive consolidated sand pack to form.

In yet another aspect, a productive consolidated sand pack product may include a productive consolidated sand pack that contains a cured resin bound to sand particles that may have a porous structure. The productive consolidated sand pack may be obtained from curing a resin composition comprising one or more of a resin, a curing agent, a chemical blowing agent, a surfactant, a carrier fluid, and optionally one or more of a pH adjusting agent, a second surfactant, and a salt. The productive consolidated sand pack may include one or more of trapped gas, bubbles, and open and connected pore space.

Other aspects and advantages of the claimed subject matter will be apparent from the following description and the appended claims.

DETAILED DESCRIPTION

Figure 1:
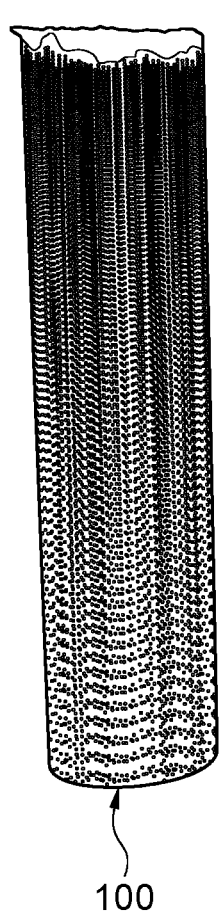
FIG. 1 shows a consolidated sand pack, including a cured epoxy-based resin without the use of a chemical blowing agent in the composition.

When a borehole penetrates a subterranean formation that is composed of unconsolidated or weakly-consolidated sand, the sand or solid particles in the formation may mobilize. The sand or solid particles may mobilize along with the formation fluids to accumulate or buildup in the bottom of the borehole or to produce the sand at the surface. Either of these situations may cause immediate or future damage during production operations that would require shutdown and remediation activities.

Conventional methods of controlling sand production in a wellbore include installing a downhole screen, packing with gravel and screen (known as gravel pack), fracturing the formation, packing the wellbore with gravel and screen (and similar variations known as frac-and-pack), and then chemically consolidating the sand.

Chemical sand consolidation techniques are directed to elimination of the sand movement by strengthening the formation structure near the wellbore. However, conventional chemical sand consolidation techniques may not place chemicals uniformly across a target zone. Conventional chemical sand consolidation techniques may also seal the collective pore space in the formation. When the pore spaces are sealed, the permeability of the formation may be damaged.

One or more embodiments of the present disclosure relate to chemical formulations for consolidating formation sand while maintaining a level of permeability. Maintaining a level of permeability relates to a productive consolidated sand pack product with a suitable level of production (fluid flow) that is the same or less than what was previously present with the unconsolidated formation.

One or more embodiments of the present disclosure relates to a wellbore treatment, including a composition having a resin and a chemical blowing agent. The chemical blowing agent may react downhole with other additives to generate a gas phase. The chemical blowing agent may decompose due to the temperature present downhole. The chemical blowing agent may decompose into products including a gas, thereby generating a gas phase.

One or more embodiments relates to introducing the wellbore treatment composition in a formation. The formation includes unconsolidated or weakly-consolidated sand. When the treatment composition reaches a target in the wellbore or the formation, the gas generated from the blowing agent maintains an extent of pore space between the sand grains. Simultaneously, the resin contacts the sand grain surfaces and bond the grains together.

One or more embodiments of the present disclosure relate to a productive consolidated sand pack obtained through the curing of the resin treatment composition of one or more embodiments. When a chemical blowing agent is provided in the resin treatment composition, a productive consolidated sand pack 200 of FIG. 2 (and 300 of FIG. 3) result. Absent a chemical blowing agent, a comparative consolidated sand 100, such as the one shown in FIG. 1, results. The comparative consolidated sand 100 is not productive due to non-porous, hardened resin formed in the pore throats of the treated sand pack.

After the chemical consolidation treatment of one or more embodiments, a permeability (in Darcy, to be described) of the productive consolidated sand pack may remain, as compared to the permeability of the non-consolidated sand pack before consolidation. In one or more embodiments, permeability of 65% or greater, such as 70% or greater, 75% or greater, 80% or greater, 85% or greater, 90% or greater, or 95% or greater, may remain in the productive consolidated sand pack, as compared to the non-consolidated sand pack before consolidation.

A 65% or greater remaining permeability (regained permeability) may result in a production level of 90% or greater, such as 95% or greater, 98% or greater, 99% or greater, or 100%, with the productive consolidated sand pack of one or more embodiments compared to when the sand is unconsolidated. This is because when the sand is loose, the well has to be choked back to prevent sand production. Choking back the well means to hold back production of the well for a time. Choking back a well reduces productivity. When the sand is a productive consolidated sand pack of one or more embodiments, the choke may be open wider to allow for a greater production rate.

Resin Treatment Composition for Sand Consolidation

In one or more embodiments, the resin treatment composition includes one or more curable resins, a curing agent, a chemical blowing agent, a surfactant, and a carrier fluid. Optionally, the composition or the carrier fluid may include a pH adjusting agent, a second surfactant, and a salt.

In one or more embodiments, the resin treatment composition includes a curable resin comprising epoxy resins; an amine curing agent; a chemical blowing agent, such as azodicarbonamide; a silicone-based surfactant; and an aqueous solution including a pH adjusting agent, such as sodium hydroxide; a second surfactant; and a salt.

In one or more embodiments, the resin treatment composition includes a curable resin comprising epoxy resins; an amine curing agent; a chemical blowing agent, such as azodicarbonamide; a silicone-based surfactant; an organic solvent; and an aqueous solution including a pH adjusting agent, such as sodium hydroxide; a second surfactant; and a salt.

In one or more embodiments, the resin treatment composition includes a curable resin comprising epoxy resins; an amine curing agent; a chemical blowing agent, such as sodium bicarbonate; a betaine-based surfactant; and an aqueous solution including a pH adjusting agent, such as sodium hydroxide; and a salt.

In one or more embodiments, the resin is a curable resin. The curable resin may include, but is not limited to, an epoxy resin, a phenolic resin, and combinations thereof.

Suitable examples of an epoxy resin may include, but are not limited to, bisphenol A-based epoxy resins, bisphenol-F-based epoxy resins, aliphatic epoxy resins, cycloaliphatic epoxy resins, polymers containing epoxy groups, and combinations thereof.

The epoxy resin may be a liquid epoxy resin. In one or more embodiments, the epoxy resin is a liquid epoxy resin without the addition of a solvent. An epoxy equivalent weight (EEW) of the epoxy resin of one or more embodiments is in a range of from about 100 grams to 400 grams, such as 100 grams to 300 grams, 100 grams to 200 grams, 200 grams to 400 grams, 200 grams to 300 grams, or 300 grams to 400 grams. EEW is the weight of resin per epoxy group.

The epoxy resin may be bisphenol-A-based epoxy resin, which is a reaction product of epichlorohydrin and bisphenol-A. An example of such an epoxy resin includes D.E.R.™ 331 ® epoxy resin (Olin Epoxy: Clayton, Missouri, USA). The epoxy resin may also be an aliphatic epoxy resin. An example of such an aliphatic epoxy resin includes D.E.R.® 731 epoxy resin (Olin Epoxy: Clayton, Missouri, USA). These epoxy resins may include 2,2-bis[p-(2,3-epoxypropoxy)phenyl]-propane.

A suitable example of a phenolic resin may include, but is not limited to, novolac (or novolak) phenolic resins.

The curable resin may be in a range of from about 0.5 to 80 weight percent (wt %), such as 1 to 75 wt %, 2 to 70 wt %, 3 to 65 wt %, 4 to 60 wt %, and 5 to 60 wt % compared to the total weight of the resin treatment composition.

In one or more embodiments, the resin treatment composition includes a curing agent. The curing agent reacts with the resin to form a cross-linked polymer network. Downhole temperatures may accelerate a reaction between the curing agent and the resin. Although the resin may cure by itself at an elevated temperature, such as at the temperatures found downhole, inclusion of a curing agent with the curable resin provides a combined reaction product with suitable mechanical properties. Such mechanical properties may include, but are not limited to, curing time, unconfined compressive strength, and permeability, as will be described.

The curing agent corresponds to the type of resin that is used. Such combinations of curing agents and corresponding epoxy resins or phenolic resins are known in the art.

The curing agent may include, but is not limited to, an amine, an imidazole, an amide, an anhydride, and combinations thereof. An amine curing agent may include, but is not limited to, an aliphatic amine, a cycloaliphatic amine, an aromatic amine, an amidoamine, a polyetheramine, a polyamide, and combinations thereof. An anhydride curing agent may include, but is not limited to, an aromatic acid anhydride, an aliphatic acid anhydride, and combinations thereof.

When a curing agent is an amine, it may be an inorganic amine or an organic amine.

A suitable example of an amine curing agent may be a polyetheramine. An example of a polyetheramine curing agent is Jeffamine D230 (Huntsman: The Woodlands, Texas, USA). This curing agent includes difunctional primary amine groups that are located on secondary carbon atoms at the end of an aliphatic polyether chain.

Another suitable example of an amine curing agent may be a cycloaliphatic diamine. An example of a cycloaliphatic diamine curing agent is VESTAMIN® IPD (IPDA) (Evonik Industries: Marl, Recklinghausen, Germany). This curing agent is based on an isophorone diamine and includes a mixture of two stereoisomers of 3-aminomethyl-3,5,5-trimethylcyclohexylamine.

In one or more embodiments, the curing agent is present in a range of from about 0.5 to 50 wt % compared to the total weight of the resin treatment composition.

In one or more embodiments, the resin treatment composition (resin system) may include a chemical blowing agent. The chemical blowing agent is a chemical ingredient or multiple chemical ingredients incorporated into the resin treatment composition that will generate a gas by an activation means. An activation means may be the downhole temperatures. An activation means may also be a chemical reaction, such as a self-reaction of a chemical or a reaction between two or more chemicals. A self-reaction may include, but is not limited to, a decomposition.

In one or more embodiments, a chemical blowing agent may release gases, such as air, nitrogen, or carbon dioxide, after the chemical ingredient(s) is in or near the target formation.

The chemical blowing agent may include, but is not limited to, carbonates, such as sodium bicarbonate, zinc bicarbonate, and other metal carbonates and bicarbonates; a mixture of sodium nitrate and ammonium chloride; a hydrazide compound, such as 4,4'-oxybis(benzenesulfonyl-hydrazide); para-toluenesulfonyl hydrazide; an azo compound; and combinations thereof.

When a carbonate or bicarbonate is included in the resin treatment composition, its function is limited to a chemical blowing agent that generates carbon dioxide and not for other uses. "Other uses" that are known in the art for a carbonate or bicarbonate may include, but are not limited to, a partitioning agent, a stabilizer (for example, in the above-ground storage of a chemical), or another common use that is not a chemical blowing agent in a downhole environment.

When a mixture of sodium nitrate and ammonium chloride is included in the resin treatment composition as a chemical blowing agent, the sodium nitrate is mixed with the curable resin and the ammonium chloride is included separately in an aqueous phase. Nitrogen gas may then be liberated through the reaction between the sodium nitrate and the ammonium chloride at the elevated downhole temperatures. The sodium nitrate and the ammonium chloride may be mixed in different parts and introduced into the wellbore separately but simultaneously.

In one or more embodiments, the chemical blowing agent is in a range of from about 0.1 to 20 wt % compared to the total weight of the resin treatment composition.

An azo compound may be used as a chemical blowing agent, as shown in Formula (I):

Formula (I)

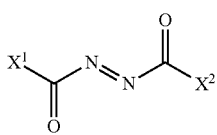

or a salt thereof, where $X^1$ and $X^2$ are each independently selected from $C_{1-6}$ alkyl, $C_{2-6}$ alkenyl, $C_{2-6}$ alkynyl, $OR^{a1}$, and $NR^{c1}R^{d1}$; and where each of $R^{a1}$, $R^{c1}$ and $R^{d1}$ are independently selected from H, $C_{1-6}$ alkyl, $C_{2-6}$ alkenyl, $C_{2-6}$ alkynyl, $C_{3-7}$ cycloalkyl, and $C_{6-10}$ aryl.

When $X^1$ and $X^2$ are $NH_2$ in formula (I), the azo compound is azodicarbonamide, as shown in Formula (II):

Formula (II)

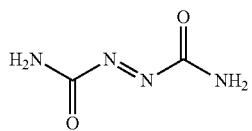

The thermal decomposition of azodicarbonamide results in the evolution of one or more of nitrogen, carbon monoxide, carbon dioxide, and ammonia gases. The one or more evolved gases may be trapped in the resin treatment composition as trapped gas or bubbles that allow a foamed structure to form. The trapped gas and bubbles become a part of the consolidated reaction product that will form, according to one or more embodiments.

In one or more embodiments, a surfactant is included in the resin treatment composition. The surfactant stabilizes a foamed structure during the gas generation and resin curing process.

The surfactant may include, but is not limited to, anionic, cationic, non-ionic, and amphoteric surfactant types, and combinations thereof. Examples of surfactants include, but are not limited to, silicones, fatty acid ethoxylate, alkyl phenol ethoxylate, sorbitan ester ethoxylate, ethylene oxide-propylene oxide block copolymer, alcohol sulfate, alcohol ethoxy sulfate, alkylbenzene sulfonate, betaine surfactants, and combinations thereof.

In one or more embodiments, the surfactant is in a range of from about 0.1 to 5 wt % compared to the total of the overall resin treatment composition.

An example of a surfactant is a silicone-based surfactant, such as VORASURF™ DC5043 (The Dow Chemical Company: Midland, Michigan, USA). VORASURF™ DC5043 includes dipropylene glycol monomethyl ether and octamethyl cyclotetrasiloxane. Another example of a surfactant is a betaine-based surfactant, such as Chembetaine™ LEC (The Lubrizol Corporation: Wickliffe, Ohio, USA). Chembetaine™ LEC includes lauramidopropyl betaine.

In one or more embodiments, the resin treatment composition optionally includes a second surfactant. The second surfactant may be one from the previously mentioned surfactant types or specific surfactants. An example of a surfactant is a sodium lauryl ether sulfate surfactant, such as CALFOAM® ES-702 (Pilot Chemical Company: West Chester, Ohio, USA). CALFOAM® ES-702 includes a sodium salt of lauryl alcohol ethoxy sulfate.

In one or more embodiments, a carrier fluid is included in the resin treatment composition. The carrier fluid may be an aqueous based solution, an organic solvent, or a combination thereof. When a combination of an aqueous based solution and an organic solvent is used as a carrier fluid, the organic solvent may allow the chemical blowing agent to disperse in the resin, compared to a carrier fluid that does not include an organic solvent.

The aqueous carrier fluid may include, but is not limited to, fresh water, seawater, brine, variations thereof, and combinations thereof.

The organic solvent may include, but is not limited to, glycol ether, ethylene glycol, dimethyl sulfoxide, dimethyl formamide, acetone, methyl ethyl ketone, petroleum distillate, and combinations thereof.

In one or more embodiments, the carrier fluid may be in a range of from about 10 to 90 wt % compared to the total weight of the resin treatment composition.

The carrier fluid may include a pH adjusting agent, a second surfactant as previously mentioned, and a salt. Examples of a pH adjusting agent include, but are not limited to, sodium hydroxide, potassium hydroxide, sodium carbonate, organic acids, inorganic acids, or combinations thereof. The second surfactant may include, but is not limited to, an anionic, cationic, non-ionic surfactant, or combinations thereof.

The salt in the carrier fluid may include, but is not limited to, a monovalent, divalent, or trivalent inorganic salt. An example of a salt may include sodium chloride (NaCl), ammonium chloride ($NH_4Cl$), and combinations thereof. When a salt mixture, such as sodium nitrate and ammonium chloride, is used, this combination acts as a chemical blowing agent as previously described. A combination of a nitrate or nitrite salt and an ammonium salt is not considered a conventional salt in one or more embodiments.

Method

The method is directed to applying one or more embodiments of the resin treatment composition for sand consolidation.

The method steps typically include introduction of a pre-flush pill, a resin treatment composition introduction, introduction of a post-flush pill, and shutting the well in. The introduced pre-flush pill may include a neutral solvent, including, but not limited to, ethylene glycol monobutyl ether, ethylene glycol isopropyl ether, or a blend of isopropyl alcohol and ethoxylated hexyl alcohol.

The components of the resin treatment composition are prepared on the surface by blending multiple chemical components into a uniform mixture. The composition is introduced into the wellbore as a single pill, where the wellbore traverses a formation including unconsolidated or weakly-consolidated sand. The mixture is introduced into the formation through wellbore circulation, a drill pipe or string, or a coiled tubing inside the wellbore. A formation may include a reservoir, which is a hydrocarbon-bearing formation. Similar methods of introducing common matrix treatment are known to one of ordinary skill in the art.

After introducing the resin treatment composition, a crosslinked polymer network may form from a resin curing reaction between the curable resin and the curing agent. This crosslinked polymer network binds the sand grains at downhole temperatures.

Upon introduction, sodium nitrate and ammonium chloride in the single pill intermingle downhole and react together at an elevated downhole temperature.

In one or more embodiments, the resin treatment composition generates a gas from the chemical blowing agent downhole. This in situ gas generation within the formation and the resin curing reaction may occur simultaneously under downhole temperatures. The in-situ gas generation allows the production of voids and channels within the resin treatment composition that are pore-like in structure. This void configuration allows permeability improvement in a productive consolidated sand pack after curing compared to a consolidated sand without in-situ gas generation.

In addition to or instead of gas generated from the chemical blowing agent by temperature activation, in situ gas may be initiated by a delayed or triggered reaction of the chemical blowing agent. A delayed reaction may be from degradation of the chemical blowing agent. A triggered reaction may be from a chemical reaction with another chemical that interacts with the chemical blowing agent, such as an ammonium compound and nitrate or nitrite compound.

After introducing the resin treatment composition and inducing the chemical reaction, the resin begins to cure at the downhole temperatures. Rigid bonding begins to develop between the resin and the sand grains.

The resin curing time is controlled by such factors as the type of the curable resin and curing agent, the relative concentration between the two, the concentration of the curable resin and curing agent in the wellbore, the temperature, and the pH of the liquid mixture. A person of ordinary skill in the art will be able to determine the appropriate amount of time for a given set of parameters that will allow the resin to cure. A typical shut-in time to allow the resin to cure may be in a range of from about 1 day (24 hours) to about 7 days (168 hours) to allow the resin to fully cure.

In one or more embodiments, the resin treatment composition is introduced into the wellbore at a concentration in a range of from about 12 liters per meter (about 1 gallon per foot) to about 250 liters per meter (about 20 gallons per foot). Here, the distance in meters (or feet) relates to a treatment distance. The treatment distance refers to the formation section that is penetrated by the wellbore. The formation section is a zone that is to be treated with the resin treatment composition. For a vertical well, the formation section is the treatment thickness of the zone. In a deviated or a horizontal well, the formation section is the lateral length that the wellbore is exposed to the target formation (the zone).

While the resin treatment composition is introduced, a ring of consolidated sand is formed around the wellbore in the formation, forming a treated portion of the formation. The concentration (volume per depth) of the resin treatment composition that is introduced determines the thickness of the ring penetration from the wellbore into the reservoir or formation. The treatment ring may penetrate the formation in areas that have unconsolidated or weakly-consolidated sand. The treatment ring may be present in and around the wellbore across the depth of the target zone. The treatment ring may be present in and around the wellbore across a partial depth of the target zone.

For example, if the wellbore is about 114.3 millimeters (mm) (about 4.5 inches) in diameter, and the rock matrix has a porosity of 20%, a composition concentration of about 12 liters per meter (about 1 gallon per foot) should result in a treatment ring thickness of about 190.5 mm (about 7.5 inches). In a similar scenario, a composition concentration of about 250 liters per meter (about 20 gallons per foot) should result in a treatment ring thickness of about 1143 mm (about 45 inches).

Utilizing too little resin treatment composition may not produce a resilient treatment ring. For example, when the resin treatment composition is introduced into a wellbore at a concentration less than about 12 liters per meter (about 1 gallon per foot), a thin consolidated ring may form. This thin consolidation ring is prone to stress cracks and leaks. Stress cracks and leaks may be due to flow and result in sand production over time.

As well, too much resin treatment composition may inhibit desired formation flow characteristics. When the resin treatment composition is introduced into a wellbore at a concentration greater than about 250 liters per meter (about 20 gallons per foot), a thick consolidated ring may form. This thick consolidated ring may inhibit overall permeability. Inhibition of overall permeability (of a consolidated sand) is a reduction in permeability that may result in negative impacts on oil and gas production. Without being bound by theory, it is believed that the consolidated sand is less permeable ("reduced" permeability) than virgin sand that is present in the formation prior to application of a sand consolidation composition utilizing the method.

After the resin treatment composition and a post-flush fluid are introduced, a shut-in period allows the resin to fully cure. While curing, sand grains bond together while the chemical blowing agent evolves gas. The typical shut-in time is in a range of from about 24 hours to 168 hours as determined by such factors as the chemical formulation and downhole temperatures. A person of ordinary skill in the art will have the know-how to determine an appropriate amount of time for the shut-in period.

In one or more embodiments, a productive consolidated sand pack is formed during the shut-in period. This productive consolidated sand pack prevents sand movement by bonding sand grains together. The productive consolidated sand pack permeability is more stable and predictable compared to a consolidated sand that originates without a chemical blowing agent.

In one or more embodiments, no filter cake is formed in the method.

Productive Consolidated Sand Pack

A productive consolidated sand pack is synthesized as a product from the one or more embodiments of the method and composition as previously set forth.

In one or more embodiments, the productive consolidated sand pack is a porous structure that is the resultant of the reaction between the curable resin and the curing agent. As well, the productive consolidated sand pack is the resultant of the reaction between the composition and the sand to be consolidated in the formation. The productive consolidated sand pack may include a crosslinked polymer network. A crosslinked polymer network is integrated with sand grains defining a hydrocarbon permeable structure. The productive consolidated sand pack may include the components and reaction products of the chemical components provided in the composition previously described.

The resultant productive consolidated sand pack has a porous structure. This porous structure is generated within the network of the cured resin via in situ gas formation from the chemical blowing agent. The resultant consolidated sand pack will be more permeable due to the porous structure generated in the presence of a chemical blowing agent, compared to the porous structure without a chemical blowing agent.

A portion of the gas generated from the chemical blowing agent is trapped in the cured resin network to create a porous structure with substantial connectivity therethrough. The surfactant(s) in the composition stabilize the gas phase in the curing resin. The surfactant allows a more stable foamed structure to develop compared to a foamed structure without a surfactant. The gas generation and resin curing may occur simultaneously, where gas is trapped in the resin as it cures, and permeability may result from maintaining the existing pore space between the sand. The open and connected pore space may preserve formation permeability of the productive consolidated sand pack formed after resin curing.

The productive consolidated sand pack is anchored in the subterranean formation with the sand grains to prevent mobilization. The open and connected pore space of the productive consolidated sand pack allows fluid flow, such as flow of produced hydrocarbons or injected water. The productive consolidated sand pack maintains integrity of its structure and properties when in the presence of water and hydrocarbons under pressure and flowing therein, or on either side of the productive consolidated sand pack.

In one or more embodiments, the productive consolidated sand pack may have an unconfined compressive strength (UCS) in a range of from about 100 (pounds per square inch) psi to greater than 3000 psi, such as from 100 psi to 3000 psi, 100 psi to 1500 psi, 450 psi to 3000 psi, and 750 psi to 3000 psi.

In one or more embodiments, the productive consolidated sand pack may have a permeability in a range of from about 0.001 Darcy to 100 Darcy, such as from 0.001 Darcy to 50 Darcy, 0.001 Darcy to 25 Darcy, 0.001 Darcy to 25 Darcy, 0.010 Darcy to 50 Darcy, 0.010 Darcy to 25 Darcy, 0.010 Darcy to 10 Darcy, 0.1 Darcy to 100 Darcy, 0.1 Darcy to 50 Darcy, 0.1 Darcy to 25 Darcy, 0.1 Darcy to 10 Darcy, 1 Darcy to 100 Darcy, 1 Darcy to 50 Darcy, 1 Darcy to 25 Darcy, and 1 Darcy to 10 Darcy.

EXAMPLES

Comparative Example 1 includes an epoxy-based resin without a chemical blowing agent in the composition. Comparative Example 1 yields an unproductive consolidated sand.

Examples 1 and 2 include an epoxy-based resin with an azo compound incorporated as a chemical blowing agent in the composition. Example 3 includes an epoxy-based resin with a sodium bicarbonate compound incorporated as a chemical blowing agent in the composition. Examples 1-3 yield productive consolidated sand packs.

Compositions of Comparative Example 1 (CE1) and Examples 1-3 are shown in Table 1.

TABLE 1

Curable chemical resin formulations.

| | | Example: | | | |
|---|---|---|---|---|---|
| | | CE1 | Example 1 | Example 2 | Example 3 |
| Part A: | Tap water | 18 grams | 18 grams | 18 grams | 18 grams |
| | 50% (w/w) sodium hydroxide | 0.9 grams | 0.9 grams | 0.9 grams | 1.8 grams |
| | ES 702 | 0.78 grams | 0.78 grams | 0.78 grams | 1.58 grams |
| | NaCl | 1 gram | 1 gram | 1 gram | — |
| | NH$_4$Cl | — | — | — | 0.38 grams |
| Part B: | DER331 | 12 grams | 12 grams | 12 grams | 8.56 grams |
| | DER731 | 6 grams | 6 grams | 6 grams | 4.28 grams |
| | JEFF-AMINE D230 | 6.4 grams | 6.4 grams | 5.7 grams | — |
| | VESTA-MIN ® IPD | — | — | — | 3.27 grams |
| | VORA-SURF™ DC5043 | 0.9 grams | 0.9 grams | 0.9 grams | — |
| | Chem-betaine™ LEC surfactant | — | — | — | 0.69 grams |
| | Azodi-carbon-amide | — | 1.1 grams | 1.1 grams | — |
| | Sodium bi-carbonate | — | — | — | 0.63 grams |
| | Dimethyl sulfoxide | — | — | 3 grams | — |
| Sand | (100 mesh) | 95 grams | 95 grams | 95 grams | 95 grams |

Comparative Example 1

Part A: pH adjusted water was formed by adding 0.9 grams of 50% weight/weight (w/w) sodium hydroxide aqueous solution and 1 gram of sodium chloride in 18 grams of tap water. 0.78 grams of CALFOAM® ES-702 surfactant was dispersed in the pH adjusted water to form the aqueous phase. In Part A, the aqueous phase was heated to 60 degrees centigrade (° C.) to facilitate the dispersion of CALFOAM® ES-702.

Part B: In a separate container, 12 grams of D.E.R.™331 epoxy resin, 6 grams of D.E.R.™731 epoxy resin, 6.4 grams of Jeffamine D230 curing agent, and 0.9 grams of VORA-SURF™ DC5043 surfactant were mixed with an overhead agitator at 500 revolutions per minute (rpm) for 1 minute (min).

The aqueous phase, Part A, and the mixture, Part B, were combined and mixed for another 3 min at 500 rpm.

To evaluate the effectiveness of consolidation, the resin mixture was transferred to a plastic beaker along with 95 grams of 100 mesh sand. The liquid resin mixture was mixed with the sand under overhead agitation (500 rpm; about 3 min) until the sand particles were well dispersed within the liquid resin. Then, the combined sand and resin mixture was transferred to a test cell where extra liquid was removed. A pressure of 1000 pounds per square inch (psi) was applied with $N_2$ on top of the test cell. The combined sand and resin mixture was cured at 121° C. in an oven for 48 hours.

The resultant comparative consolidated sand 100 structure of Comparative Example 1 is shown in FIG. 1.

Example 1

Part A: pH adjusted water was formed by adding 0.9 grams of 50% (w/w) sodium hydroxide aqueous solution and 1 gram of sodium chloride in 18 grams of tap water. 0.78 grams of CALFOAM® ES-702 surfactant was added to the pH adjusted water to form the aqueous phase. In Part A, the aqueous phase was heated to 60° C. to facilitate the dispersion of CALFOAM® ES-702.

Part B: In a separate container, 12 grams of D.E.R.™331 epoxy resin, 6 grams of D.E.R.™731 epoxy resin, 6.4 grams of Jeffamine D230 curing agent, 0.9 grams of VORA-SURF™ DC5043 surfactant, and 1.1 grams of azodicarbonamide were mixed with an overhead agitator at 500 rpm for 1 min.

The aqueous phase, Part A, and the mixture, Part B, were combined and mixed for another 3 min at 500 rpm.

The same procedure was used to evaluate the effectiveness of consolidation of Comparative Example 1 was utilized for Example 1.

Figure 2:
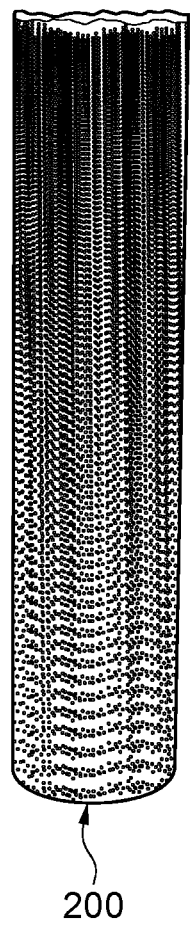
FIG. 2 shows a productive consolidated sand pack, including a cured epoxy-based resin having incorporated an azo compound as a chemical blowing agent, according to one or more embodiments.

The resultant productive consolidated sand pack 200 structure of Example 1 is shown in FIG. 2.

Example 2

Part A: pH adjusted water was formed by adding 0.9 grams of 50% (w/w) sodium hydroxide aqueous solution and 1 gram of sodium chloride in 18 grams of tap water. 0.78 grams of CALFOAM® ES-702 surfactant was dispersed in the pH adjusted water to form the aqueous phase. In Part A, the aqueous phase may be heated to 60 degrees centigrade to facilitate the dispersion of CALFOAM® ES-702.

Part B: In a separate container, 1.1 grams of azodicarbonamide and 3 grams of dimethyl sulfoxide was mixed together using a tongue depressor to form a homogeneous solution, then 12 grams of D.E.R.™331 epoxy resin, 6 grams of D.E.R.™731 epoxy resin, 6.4 grams of Jeffamine D230 curing agent, and 0.9 grams of VORASURF™ DC5043 surfactant were added to the solution and mixed with an overhead agitator at 500 rpm for 1 min.

The aqueous phase, Part A, and the mixture, Part B, were combined and mixed for another 3 min at 500 rpm.

The same procedure used to evaluate the effectiveness of consolidation of Comparative Example 1 was utilized for Example 2.

Figure 3:
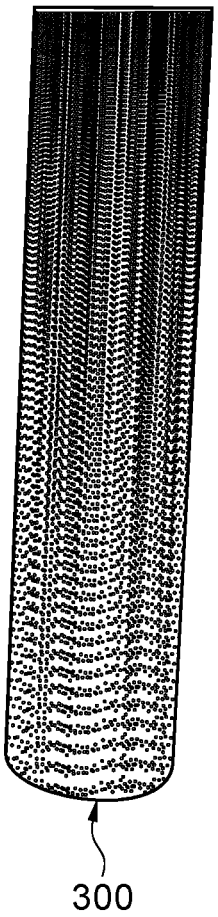
FIG. 3 shows a productive consolidated sand pack, including a second cured epoxy-based resin having incorporated an azo compound as a chemical blowing agent, according to one or more embodiments.

The resultant productive consolidated sand pack 300 structure of Example 2 is shown in FIG. 3.

Example 3

Part A: pH adjusted water was formed by adding 1.8 grams of 50% (w/w) sodium hydroxide aqueous solution and 0.38 grams of ammonium chloride in 36 grams of tap water. 1.58 grams of CALFOAM® ES-702 surfactant was dispersed in the pH adjusted water to form the aqueous phase.

Part B: In a separate container, 8.56 grams of D.E.R.™331 epoxy resin, 4.28 grams of D.E.R.™731 epoxy resin, 3.27 grams of VESTAMIN® IPD (IPDA) curing agent, 0.69 grams of Chembetaine™ LEC surfactant, and 0.63 grams of sodium bicarbonate ($NaHCO_3$) were mixed with an overhead agitator at 1000 rpm for 3 min.

The aqueous phase, Part A, and the mixture, Part B, were combined and mixed for another 3 min at 1000 rpm.

To evaluate the effectiveness of consolidation, the resin mixture was transferred to a plastic beaker with 95 grams of 100 mesh sand. The liquid resin mixture with mixed with the sand under overhead agitation (500 rpm, about 3 min) until the sand particles were well dispersed in the liquid resin. Then, the combined sand and resin mixture was transferred to a test cell where extra liquid was removed. A pressure of 1000 psi was applied with $N_2$ on top of the test cell, and a pressure of 500 psi was applied with water at the bottom of the test cell. The combined sand and resin mixture was cured at 149 degrees centigrade in an oven for 5 hours.

For the Comparative Example and the three Examples, the loose sand particles became consolidated into cylindrical core plugs. Two evaluation experiments were conducted to evaluate the properties of the resin consolidated sand pack (cores) formed in the static cell as listed in the examples. The first experiment tests the unconfined compressive strength (UCS) of the consolidated sand pack formed in the static cell. The second experiment tests the permeability of the consolidated sand pack formed in the static cell. Both experimental methods are commonly known and understood in the art.

A typical UCS test is performed by creating a cylindrical consolidate sand pack with a dimension of length to diameter ratio (L/D) of 2:1. The ends of the cylindrical are flat, parallel, and orthogonal to the axis of the cylinder. The core is placed in between two platens with no confinement around the circumference of the cylinder. Axial stress is applied through the platens to compress the core until catastrophic failure. The stress level at the failure is the UCS. The cell permeability test is a common core permeability testing known to one of ordinary skill of the art.

In the UCS tests, loose sand pack before being treated by a resin composition and method was at 0 psi. After treatment, the UCS of consolidated sand pack is measured using an Instron 5966 test frame with a 10 kilonewton (kN) loading cell. Cylindrical samples of 5 centimeters (cm) in length and 2.5 cm in diameter are cut from consolidated sand pack and used for the testing. UCS for Comparative Example 1 is measured at 545 pounds per square inch (psi), and UCS for Example 1 and Example 2 are measured at 582 psi and 590 psi, respectively. Example 1 showed a 6.8% increase in USC while Example 2 showed an 8.2% increase in USC.

In the permeability tests, loose sand pack before being treated by a resin composition and method was in the range of 2 Darcy to 100 Darcy, depending on the particle size distribution and the packing process and density. After treatment, the consolidated core permeability measured from 0.010 Darcy to 10 Darcy. Permeability to 2% KCl aqueous solution through the consolidated sand pack is measured by a common core flooding equipment in which a confining pressure of 800 psi and a pore pressure of 200 psi is applied. The permeability of the samples at a flow rate of 15 milliliters per minute (mL/min) was determined to be 1332 millidarcy (mD) for Comparative Example 1, 1779 mD for Example 1, and 2852 mD for Example 2. Example 1 showed a 33.6% increase in permeability and Example 2 showed a 114.1% increase in permeability over Comparative Example 1. The porous structures formed by Examples 1 and 2 were not only stronger but also more effective in permitting saline solution movement through the consolidated sand.

In addition to the previously described experiments, a separate experimental method was used to load the sand in a dynamic flow cell instead of a static cell.

This experimental method was performed by loading the sand in a dynamic flow cell instead of the static setup as described in the previous test examples. 50 to 500 grams of sand particles of sizes from 20 mesh to 200 mesh in a random distribution were packed into a rubber sleeve of a typical core flooding cell. Screens were placed at the exit end of the sand pack. The dynamic flow cell, or flow system, was heated to specified temperature between 23 degrees centigrade to 177 degrees centigrade (between about 75 to 350 degrees Fahrenheit) depending on the application. A back pressure of 500 psi to 3000 psi was applied to the flow system. A confining pressure was applied to the circumference of the sand pack containing a rubber sleeve. The confining pressure was 500 psi greater than the back pressure. Water or oil was introduced into the dynamic flow cell to measure the initial permeability of the sand pack before the chemical treatment. This initial permeability was in the range of 0.05 Darcy to 1000 Darcy.

One to 10 pore volume (PV) of the resin composition was introduced through the sand pack, followed by 0 to 3 pore volume of water or oil as a post-flush. After the introduction, the setup was shut-in for a duration from 5 to 48 hours.

After the shut-in period, water and oil were introduced again through the sand pack to measure the regained permeability after it has been treated by the chemical consolidation system. The regained permeability ranged from 0.01 Darcy to 10 Darcy.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially" as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it should be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function, not limited to structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed is:

1. A productive consolidated sand pack product, comprising:
    a productive consolidated sand pack that contains a cured resin bound to sand particles having a porous structure that is obtained from curing of a resin treatment composition comprising a resin, a curing agent, a chemical blowing agent comprising a chemical ingredient or multiple chemical ingredients incorporated into the resin treatment composition that will generate a gas by an activation means, a carrier fluid, a surfactant, and optionally one or more of a pH adjusting agent, a second surfactant, and a salt,
    wherein the resin is a curable epoxy resin and the curable epoxy resin has an epoxy equivalent weight of about 100 g to about 400 g, and
    wherein the resin treatment composition comprises the curable epoxy resin in an amount in a range of 1 to 75 wt % and the curing agent in an amount in a range of 0.5 to 33 wt %,
    where the productive consolidated sand pack includes one or more of trapped gas, bubbles, and open and connected pore space,
    wherein the carrier fluid comprises a mixture of an aqueous based solution and an organic solvent selected from the group consisting of glycol ethers, ethylene glycol, dimethyl sulfoxide, dimethyl formamide, acetone, and methyl ethyl ketone, and
    wherein including the organic solvent in the mixture disperses the chemical blowing agent within the resin.

2. The productive consolidated sand pack of claim 1, wherein the porous structure has a permeability of from about 65% to about 95%.

3. The productive consolidated sand pack of claim 1, wherein the curing agent is selected from the group consisting of an amine, an imidazole, an amide, an anhydride, and combinations thereof.

4. The productive consolidated sand pack of claim 1, wherein the chemical blowing agent releases one or more gases selected from the group consisting of air, nitrogen, and carbon dioxide which are trapped in the cured resin and allow a foamed structure to form.

5. The productive consolidated sand pack of claim 1, wherein the chemical blowing agent is selected from the group consisting of a carbonate, a mixture of sodium nitrate and ammonium chloride, a hydrazide compound, an azo compound, and combinations thereof.

6. The productive consolidated sand pack of claim 1, wherein the resin treatment composition comprises the chemical blowing agent in an amount in a range of 0.1 to 20 wt %.

7. The productive consolidated sand pack of claim 1, wherein the resin treatment composition includes the second surfactant, wherein the surfactant and the second surfactant are selected from the group consisting of an anionic surfactant, a cationic surfactant, a non-ionic surfactant, and an amphoteric surfactant.

8. The productive consolidated sand pack of claim 1, wherein the resin treatment composition comprises the surfactant in an amount in a range of 0.1 to 5 wt %.

9. The productive consolidated sand pack of claim 1, wherein the resin treatment composition comprises the carrier fluid in an amount in a range of 10 to 90 wt %.

10. The productive consolidated sand pack of claim 1, wherein the resin treatment composition includes the pH adjusting agent and wherein the pH adjusting agent is selected from the group consisting of sodium hydroxide, potassium hydroxide, sodium carbonate, organic acids, inorganic acids, and combinations thereof.

11. The productive consolidated sand pack of claim 1, wherein the resin treatment composition includes the salt and wherein the salt is selected from the group consisting of a monovalent, divalent, or trivalent inorganic salt, and combinations thereof.

12. The productive consolidated sand pack of claim 1, wherein the productive consolidated sand pack has an unconfined compressive strength in a range from about 100 psi to about 3000 psi.

* * * * *